United States Patent
Liu

(10) Patent No.: US 7,293,784 B2
(45) Date of Patent: Nov. 13, 2007

(54) ADJUSTABLE COMPUTER CASE SUPPORT

(76) Inventor: Ming-Tang Liu, 9th Floor, No. 155, Sec. 1, KeeLung Road, Taipei (TW)

( * ) Notice: Subject to any disclaimer, the term of this patent is extended or adjusted under 35 U.S.C. 154(b) by 718 days.

(21) Appl. No.: 10/626,703

(22) Filed: Jul. 25, 2003

(65) Prior Publication Data

US 2005/0016079 A1     Jan. 27, 2005

(51) Int. Cl.
*B62B 3/02*     (2006.01)
(52) U.S. Cl. .................. 280/35; 280/42; 280/79.11; 280/79.3
(58) Field of Classification Search .............. 280/32.5, 280/32.6, 47.38, 47.41, 47.25, 47.4, 35, 638, 280/639, 642, 79.2, 79.11, 79.3; D14/302, D14/308, 314; 108/1, 5–7, 137, 147.21; 211/150, 165, 168, 169, 169.1; 248/670, 248/129, 923, 346.01, 346.06, 346.07, 346.11; 312/223.1–2, 351.9, 351.11, 351.13; 361/683, 361/679
See application file for complete search history.

(56) References Cited

U.S. PATENT DOCUMENTS

| | | | |
|---|---|---|---|
| 1,193,417 A * | 8/1916 | Pauls | 108/7 |
| 2,230,511 A * | 2/1941 | Luttrup | 248/670 |
| 3,570,679 A * | 3/1971 | Edson | 211/47 |
| 5,056,672 A * | 10/1991 | Yamada | 211/149 |
| 5,294,141 A * | 3/1994 | Mentessi et al. | 280/250.1 |
| 5,295,648 A * | 3/1994 | Hames | 248/149 |
| 5,752,738 A * | 5/1998 | Onishi et al. | 297/61 |
| 6,352,275 B1 * | 3/2002 | Lindenkamp | 280/250.1 |
| 6,425,567 B2 * | 7/2002 | Schutze | 248/452 |
| 6,504,707 B2 * | 1/2003 | Agata et al. | 361/681 |
| 2004/0217677 A1 * | 11/2004 | Durand et al. | 312/108 |

* cited by examiner

*Primary Examiner*—Christopher P. Ellis
*Assistant Examiner*—Vaughn T. Coolman

(57) ABSTRACT

An adjustable computer case support includes two side frames and a bottom frame located between the two side frames. Each of the side frames is a substantially triangular frame including a curved front member, a lower member, and a rear member. The bottom frame is pivotally connected at a rear end to the lower members of the two side frames, so that a front end of the bottom frame may be raised or lowered and detachably connected to the curved front members of the side frames to set the bottom frame to a desired inclination. The bottom frame includes two supporting members connected to two lateral sides of a width-adjusting member, which may be, for example, an X-type bracing having two intersected and pivotally connected braces, so that an overall width of the bottom frame may be increased or decreased depending on actual need.

8 Claims, 7 Drawing Sheets

ADJUSTABLE COMPUTER CASE SUPPORT

FIELD OF THE INVENTION

The present invention relates to an adjustable computer case support, and more particularly to a computer case support having a bottom frame that could be adjusted to different inclinations and different widths.

BACKGROUND OF THE INVENTION

A personal computer, particularly a desktop computer, typically includes a computer case in which important components of the computer, including the main board and the hard disk, are mounted. While the computer case is normally positioned on a desktop, it may also be positioned below the desktop for a user to effectively utilize the space above the desktop. There are developed different types of supports for supporting a computer case that is not positioned on the desktop. Such supports may be connected to an underside of the desktop or independently located at a selected place. In either case, a user has to bend over to operate the power on/off button or to insert or eject a disk when the computer case is positioned on the support. That is, the conventional computer case supports are not ideally designed to meet the ergonomics.

Taiwanese Patent Application No. 86220488 discloses a universal stand for computer case. The universal stand includes first and second leg frames pivotally connected to each other at middle points thereof. Pads and stop bars are provided at outer ends of the two leg frames. By best adjusting an angle contained between the two intersected leg frames, the stand may stably support a computer case thereon with the stop bars bearing against two lateral sides of the computer case. The universal stand only allows the computer case to horizontally position thereon, and a user has to bend over to operate the computer case. Although it is possible to increase the number of pads provided at the ends of the leg frames to increase the height of the stand, the stand tends to unstably swing when the considerably heavy computer case is positioned thereon.

Taiwanese Patent Application No. 88209834 discloses a universal computer case support mainly including a base having supporting members provided at four corners thereof. The supporting members may be pivotally turned and have stop members provided thereon. A receiving space defined by the four supporting members may be adjusted by turning the supporting members to desired positions, so that the universal support may be used to stably support differently sized computer cases with the stop members bearing against sidewalls of the computer case positioned thereon. The base is mounted at four corners with casters to allow a user to move the universal support easily. However, the universal computer case support also horizontally supports a computer case thereon, and a user has to bend over to operate the computer case horizontally supported on the base.

It is therefore tried by the inventor to develop an adjustable computer case support having a bottom frame that may be adjusted to an inclination for a user to operate a computer case positioned thereon in a most comfortable manner. The bottom frame may also be adjusted to different width for supporting differently sized computer cases.

SUMMARY OF THE INVENTION

A primary object of the present invention is to provide an adjustable computer case support, in which a bottom frame for supporting a computer case thereon is located between two side frames with a rear end thereof pivotally connected to rear ends of the two side frames, so that the bottom frame may be set to a desired inclination by raising or lowering a front end thereof before detachably connecting the front end to the two side frames.

Another object of the present invention is to provide an adjustable computer case support, in which a bottom frame located between two side frames for supporting a computer case thereon includes a width-adjusting member and two supporting members movably connected to two lateral sides of the width-adjusting member, so that the bottom frame may be adjusted to different widths for supporting differently sized computer cases. In an embodiment of the present invention, the width-adjusting member is an X-type bracing including two superposed and intersected braces that are pivotally connected to each other at respective middle points.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
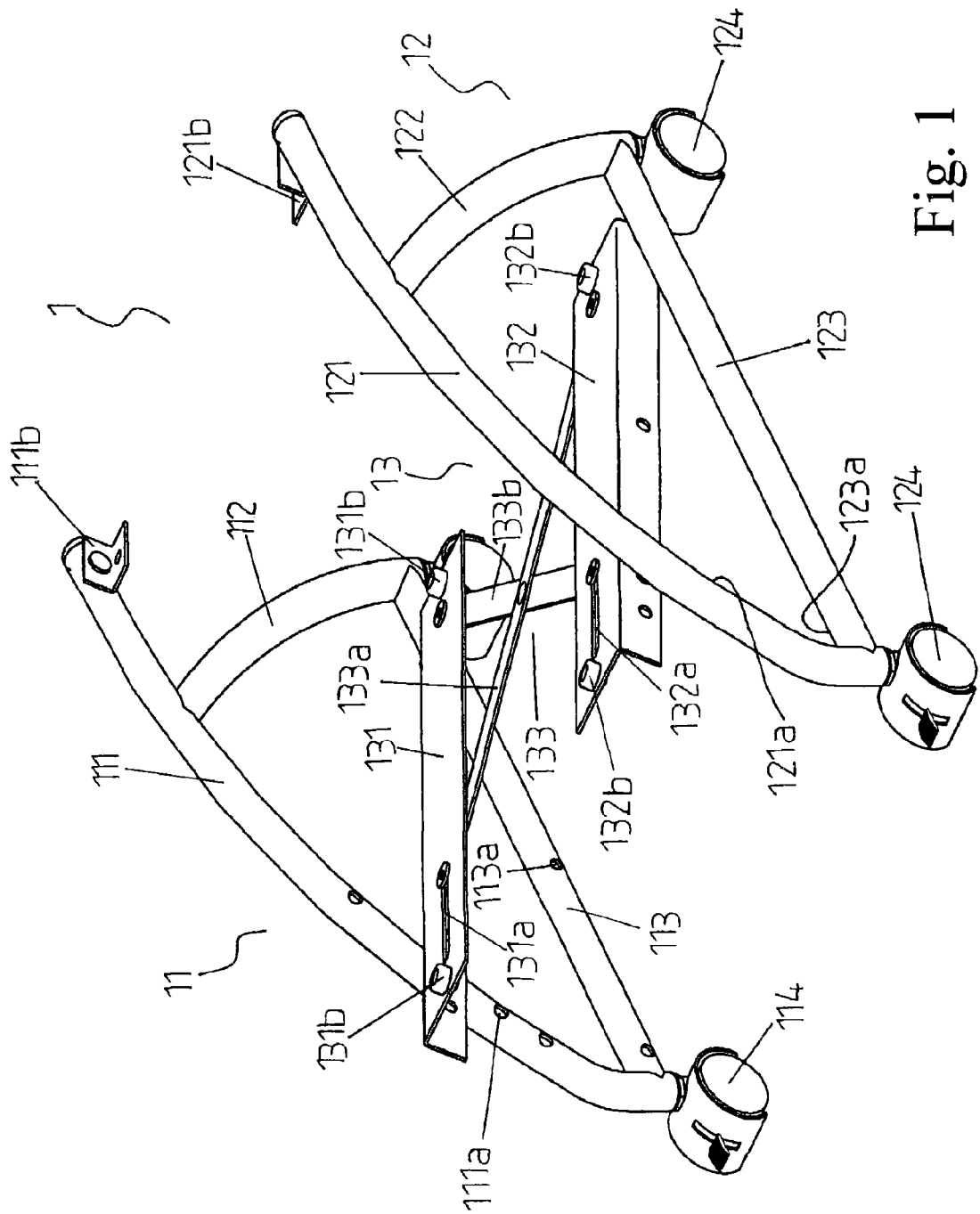
FIG. 1 is an assembled perspective view of an adjustable computer case support according to a first embodiment of the present invention.
Figure 2:
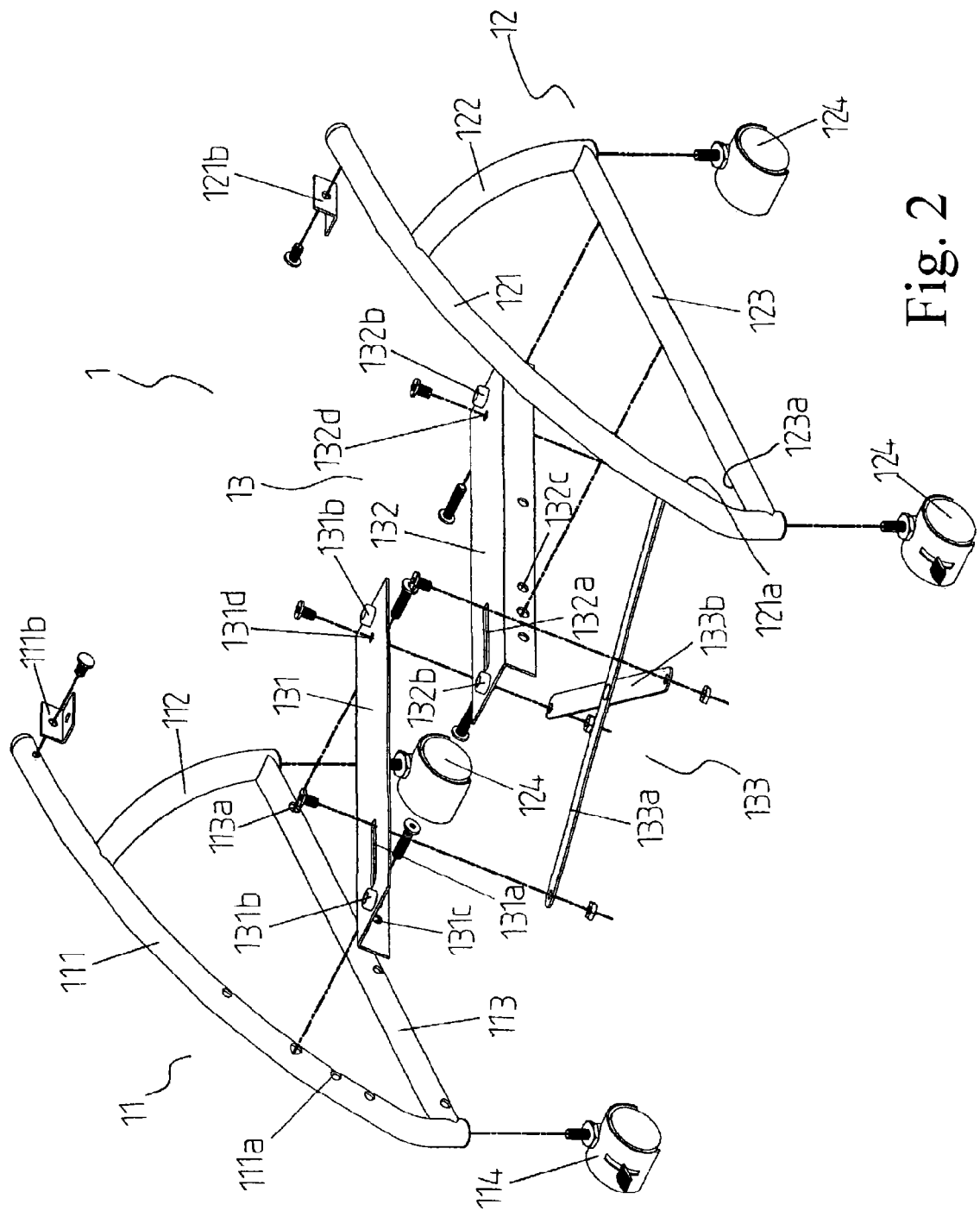
FIG. 2 is an exploded perspective view of FIG. 1.

Please refer to FIGS. 1 and 2 that are assembled and exploded perspective views, respectively, of an adjustable computer case support 1 according to a first embodiment of the present invention. As shown, the computer case support 1 mainly includes two substantially triangular side frames 11, 12 respectively formed from a curved front member 111, 121, a rear member 112, 122, and a lower member 113, 123. The curved front members 111, 121 are provided at respective inner front portion with a line of spaced through holes 111*a*, 121*a*, and at respective rear end with a pivotally rotatable right-angled bracket 111*b*, 121*b*. The lower members 113, 123 are provided at respective inner side at predetermined positions with a line of spaced through holes 113*a*, 123*a*. Moreover, two pairs of casters 114, 124 are separately connected to lower ends of the front and rear members 111, 112 and 121, 122 of the two side frames 11, 12.

The adjustable computer case support 1 also includes a bottom frame 13 located between the two side frames 11, 12. The bottom frame 13 includes two L-sectioned long supporting members 131, 132, and a width-adjusting member 133 for connecting at two lateral ends to the two supporting members 131, 132.

Each of the two supporting members 131, 132 is provided on a top surface near a front end thereof with a long slot 131a, 132a, and near a rear end thereof with a mounting hole 131d, 132d. Two pairs of anti-slip pads 131b, 132b are separately located in front of the long slots 131a, 132a and behind the mounting holes 131d, 132d. Each of the two supporting members 131, 132 is also provided on a side surface at predetermined positions with a line of spaced mounting holes 131c, 132c.

Figure 3:
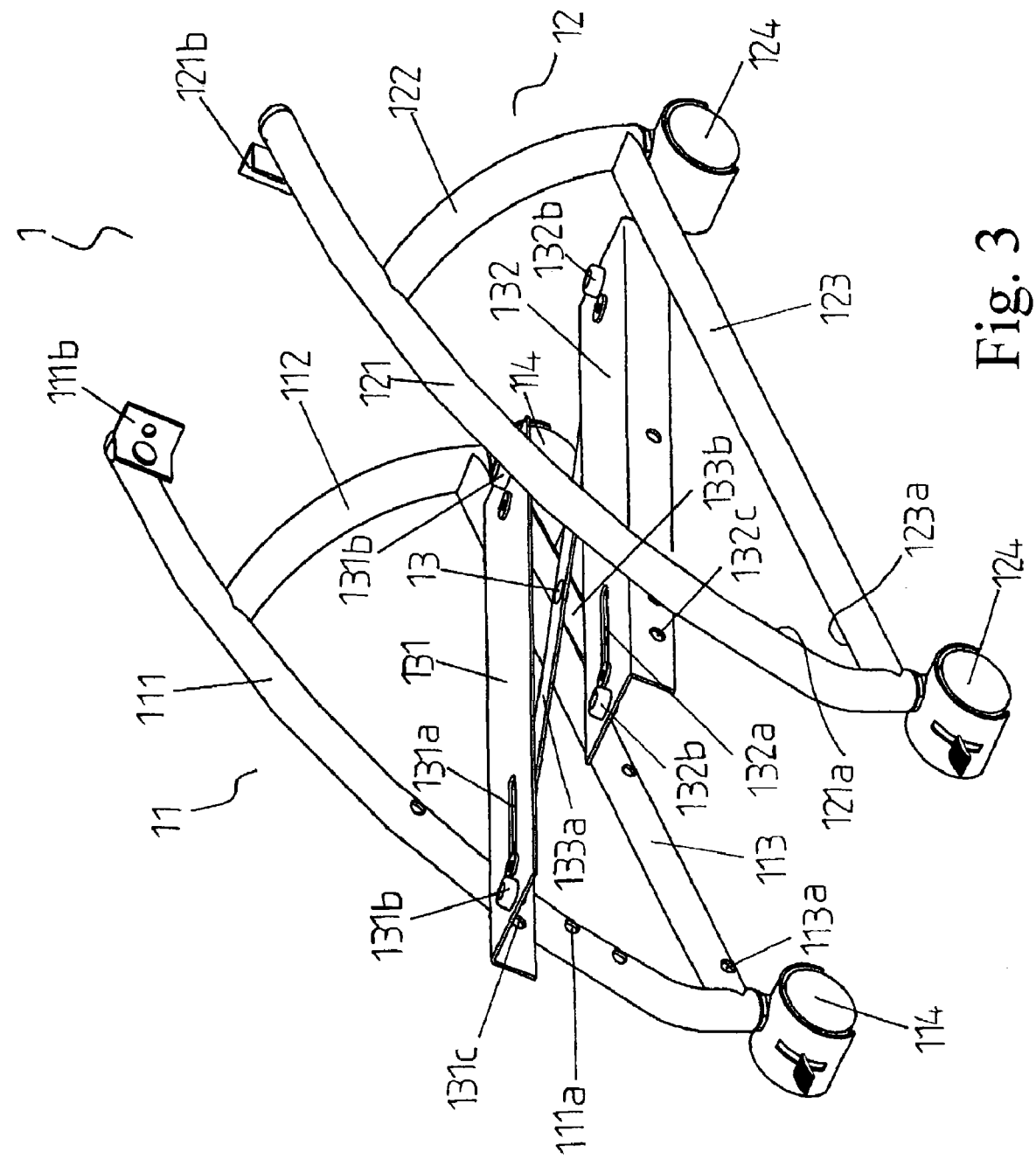
FIG. 3 shows a bottom frame of the adjustable computer case support of FIG. 1 is adjusted to a reduced width.

The width-adjusting member 133 is an X-type bracing including two intersected braces 133a, 133b in the form of two long plates pivotally connected to each other at middle points. The X-type bracing 133 is connected to the two supporting members 131, 132 by separately aligning holes provided at outer ends of the two braces 133a, 133b with the two long slots 131a, 132a and the two mounting holes 131d, 132d on the two L-sectioned supporting members 131, 132, and then extending screws through the aligned holes to tightly engage with nuts. To allow moving of the two supporting members 131, 132 toward or away from each other, two front ends of the braces 133a, 133b are loosely screwed to the long slots 131a, 132a to slide along the long slots 131a, 132a, as shown in FIG. 3.

To connect the bottom frame 13 to the two side frames 11, 12, first align two of the mounting holes 131c, 132c closest to the rear ends of the side surfaces of the two L-sectioned supporting members 131, 132 with two of the through holes 113a, 123a closest to the rear ends of the lower members 113, 123 of the two side frames 11, 12, and then extend screws through the aligned holes 131c, 113a and 132c, 123a to tightly engage with two nuts, so that the two supporting members 131, 132 are pivotally connected at rear ends to the lower members 113, 123 near rear ends thereof, allowing the whole bottom frame 13 to be pivotally turnable about a rear end relative to the two side frames 11, 12 to raise or lower a front end of the bottom frame 13 depending on a user's actual need.

Figure 4:
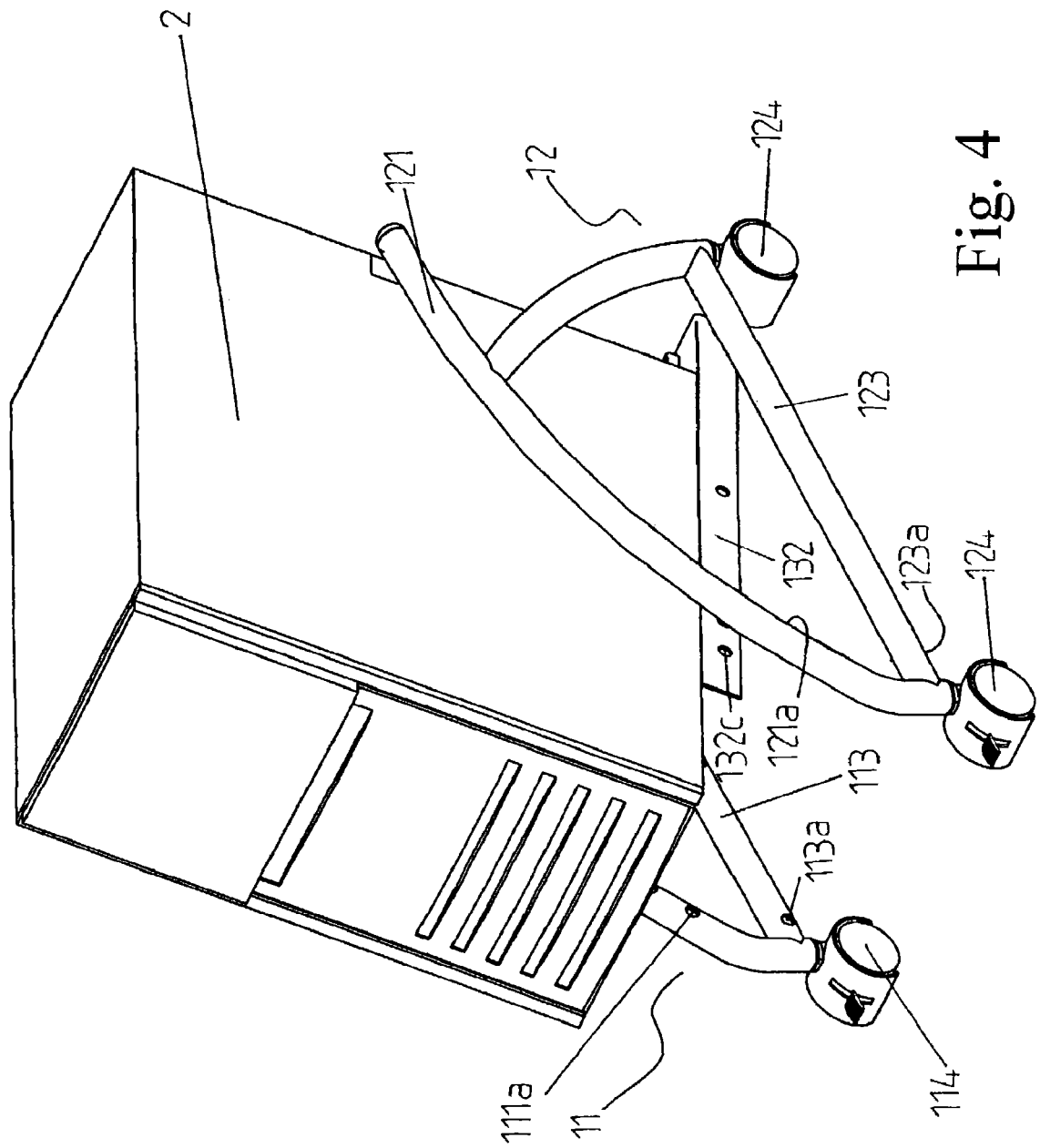
FIG. 4 shows the adjustable computer case support of FIG. 1 having a computer case supported thereon.

After an optimal inclination of the bottom frame 13 has been decided, a user may then align any one of the mounting holes 131c, 132c on the side surface of the two L-sectioned supporting members 131, 132 with a suitable one of the through holes 111a, 121a on inner front portions of the curved front members 111, 121, and then tightens the supporting members 131, 132 to the curved front members 111, 121 of the side frames 11, 12 at the aligned holes 131c, 111a and 132c, 121a with screws and nuts. And, the whole computer case support 1 is ready for use. FIG. 4 shows a computer case 2 is positioned on the rearward and downward inclined bottom frame 13 between the two side frames 11, 12 and prevented by the anti-slip pads 131b, 132b from sliding backward on the bottom frame 13. Meanwhile, the two right-angled brackets 111b, 121b provided at the rear end of the curved front members 111, 121 may be pivotally turned to stably bear against two rear vertical edges of the computer case 2 and prevent the same from sliding backward.

Figure 5:
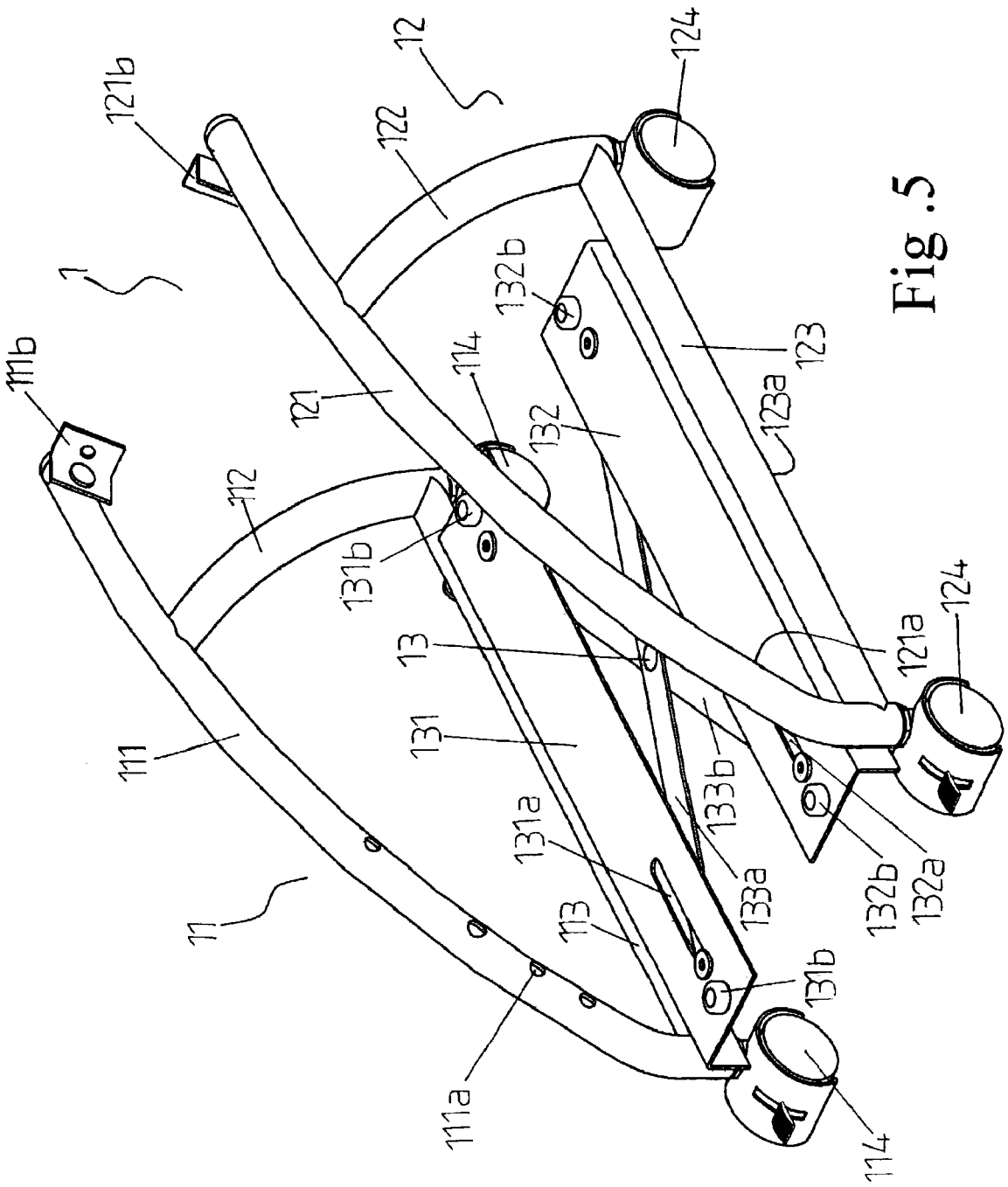
FIG. 5 shows the bottom frame of the adjustable computer case support of FIG. 1 is adjusted to a horizontal position.

Please now refer to FIG. 5. When it is desired for the bottom frame 13 to horizontally locate between the two side frames 11, 12, simply loosen the screws and nuts tightening the supporting members 131, 132 to the inner front portions of the front members 111, 121 of the two side frames 11, 12, so as to lower the front end of the bottom frame 13. Then, align the two most front mounting holes 131c, 132c on the side surfaces of the L-sectioned supporting members 131, 132 with two most front through holes 113a, 123a on the two lower members 113, 123 of the two side frames 11, 12, and tighten the two supporting members 131, 132 to the two lower members 113, 123 with screws and nuts via the aligned holes. The bottom frame 13 is now horizontally positioned between the two side frames 11, 12.

With the above arrangements, the bottom frame 13 may be adjusted not only to different inclinations, but also to different widths depending on the actual width of a computer case to be supported thereon. The computer case support of the present invention therefore provides a high flexibility in dimensions for the user to select an operating position best suitable for him.

Figure 6:
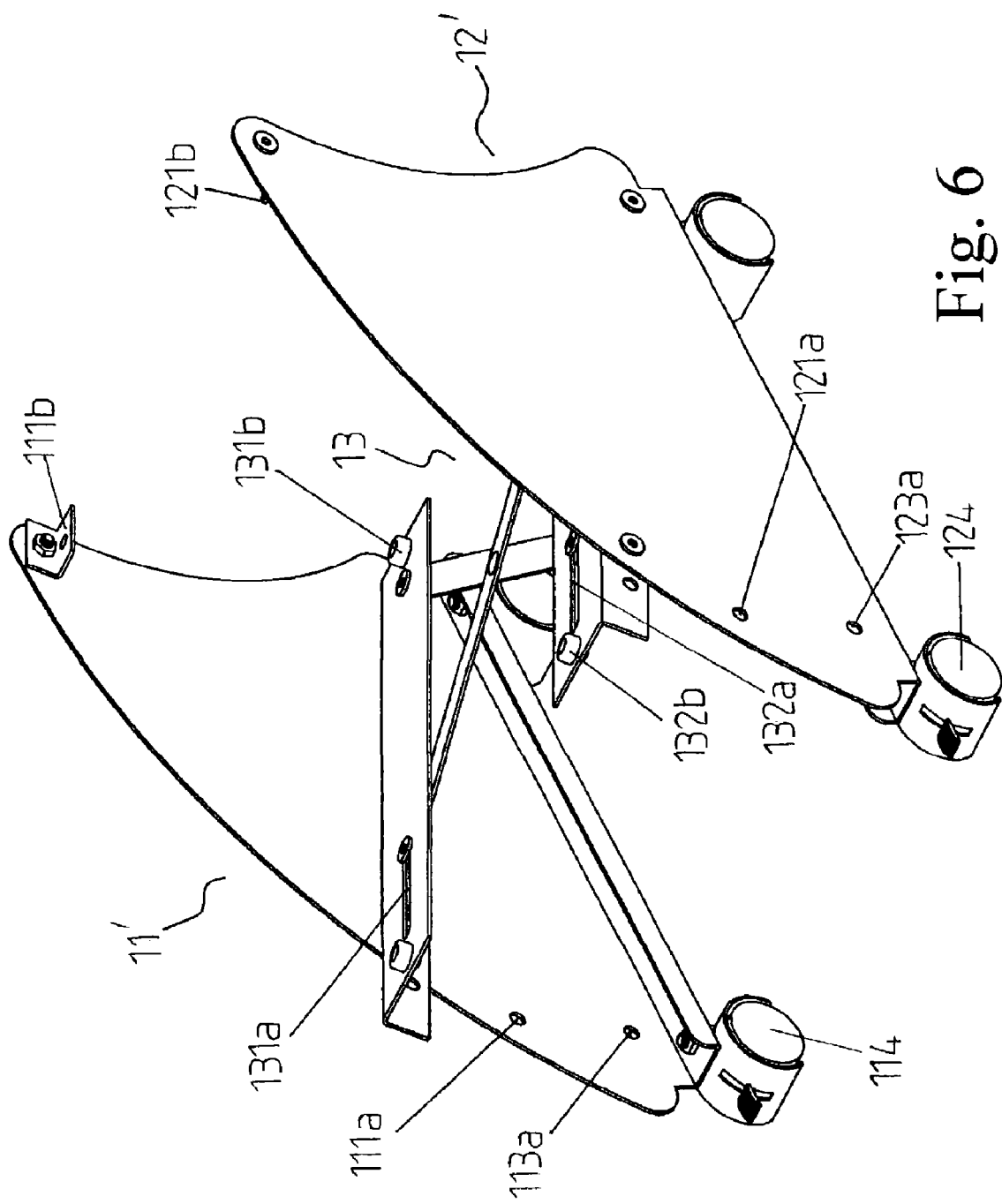
FIG. 6 is an assembled perspective view of an adjustable computer case support according to a second embodiment of the present invention.

FIG. 6 shows an adjustable computer case support according to a second embodiment of the present invention. In the second embodiment, the adjustable computer case support includes two substantially triangular side boards 11', 12', each of which has an L-sectioned lower edge. Two pairs of casters 114, 124 are separately screwed to front and rear ends of the L-sectioned lower edges of the two side boards 11', 12'. The adjustable computer case support of the second embodiment has a bottom frame 13 structurally and functionally similar to that in the first embodiment and is mounted between the two side boards 11', 12' in the same manner as that in the first embodiment.

The side boards 11', 12' not only enhance the stability of the adjustable computer case support 1 but also provide the support 1 with a beautiful appearance.

Figure 7:
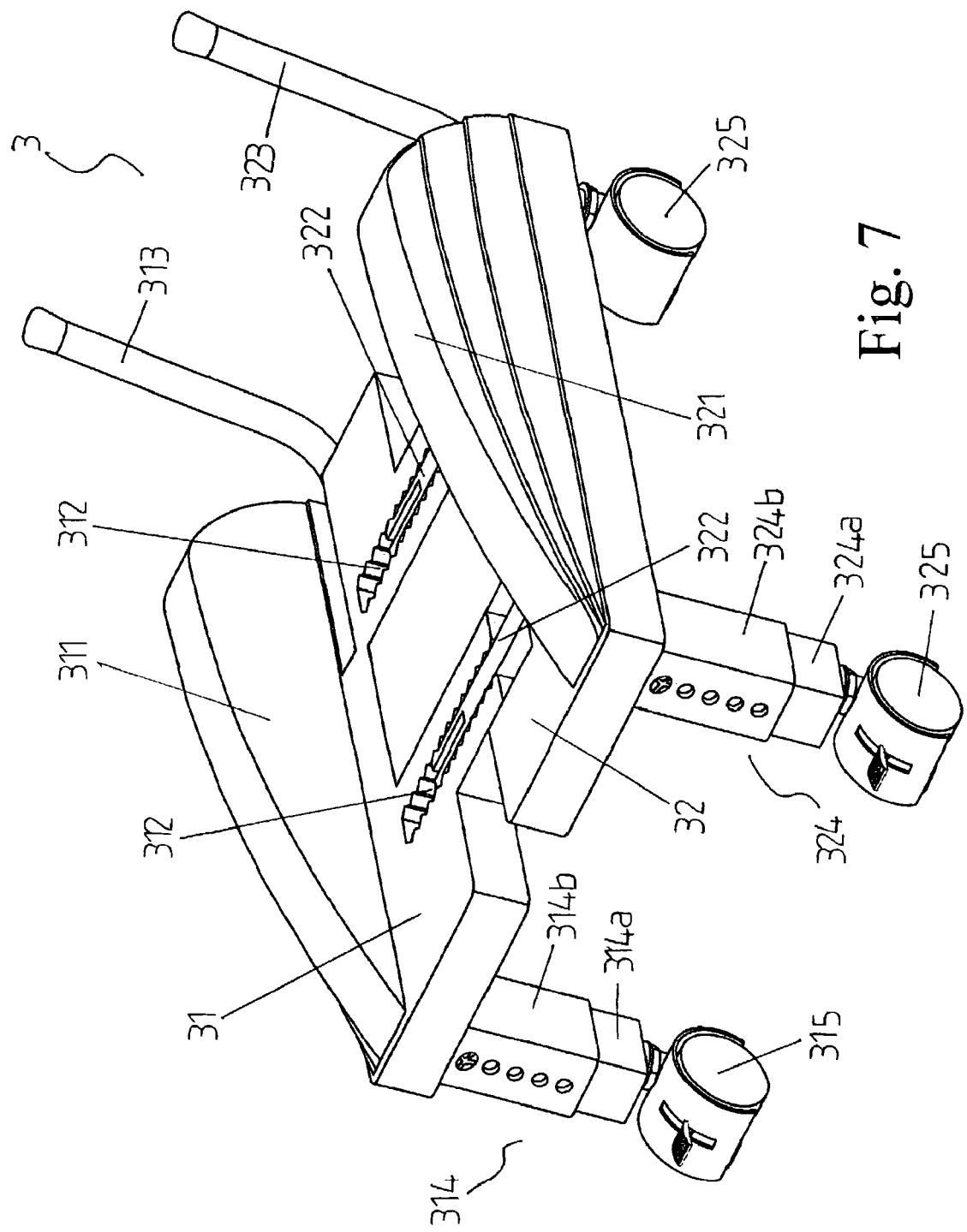
FIG. 7 is an assembled perspective view of an adjustable computer case support according to a third embodiment of the present invention.

FIG. 7 shows an adjustable computer case support 3 according to a third embodiment of the present invention. As shown, the adjustable computer case support 3 includes two supporting seats 31, 32, each of which has a sidewall 311, 321 raised from a lateral outer edge. The two supporting seats 31, 32 together define a receiving space between them for a computer case to locate therein. Two backing bars 313, 323 are upward extended from rear ends of the two supporting seats 31, 32 to bear against a rear side of the computer case positioned on the adjustable computer case support 3 and prevent the computer case from sliding backward. The two supporting seats 31, 32 are provided at respective lateral inner edge with internally toothed slots 312 and racks 322. Each of the racks 322 is movably engaged with a corresponding toothed slot 312. A pair of front casters 315, 325 are connected to lower front ends of the two supporting seats 31, 32 via two telescopic legs 314, 324, and a pair of rear casters 315, 325 are directly connected to lower rear ends of the two supporting seats 31, 32. Each of the two telescopic legs 314, 324 includes an inner tube 314a, 324a, and an outer tube 314b, 324b. Two vertical lines of spaced through holes are correspondingly provided on two opposite sides of each inner tube 314a, 324a and outer tube 314b, 324b. After the inner tubes 314a, 324a have been extended from the outer tubes 314b, 324b by a desired length with the through holes on the inner tubes separately aligned with those on the outer tubes, the inner and the outer tubes may be held in place with screws extended through the aligned through holes on the two opposite sides of the telescopic legs 314, 324, so that front ends of the two supporting seats 31, 32 are set to a desired height.

An overall width of the receiving space between the two sidewalls 311, 321 may be adjusted by moving the racks 322 into the toothed slots 312 by different depth.

The toothed slots 312 and the racks 322 provided in the third embodiment of the present invention are functionally equivalent to the X-type bracing 133 in the first and second embodiments in terms of adjusting an overall width of the computer case support, and the telescopic legs 314, 324 are also functionally equivalent to the curved front members 111, 121 in terms of adjusting the inclination of the computer case support. In a broad sense, any other structural design that may equivalently achieve the effect of adjusting the width and the inclination of the bottom frame of the computer case support of the present invention shall be considered as an equivalent of the present invention. That is, the present invention has been described with some preferred embodiments thereof and it is understood that many changes and modifications in the described embodiments can be carried out without departing from the scope and the spirit of the invention as defined by the appended claims.

What is claimed is:

1. An adjustable computer case support, comprising two side frames, and a width-adjustable bottom frame located between said two side frames; said bottom frame having a rear edge pivotally connected at two outer ends to said two side frames, so that a front edge of said bottom frame may be raised or lowered to a desired height relative to said rear edge and detachably connected at two outer ends to said two side frames; and wherein each of said two side frames is a substantially triangular frame including a curved front member, a lower member, and a rear member; said curved front member being provided at predetermined positions with a plurality of through holes; and said bottom frame being pivotally connected at two outer ends of said rear edge to said two lower members of said two side frames, and detachably connected at two outer ends of said front edge to two of said through holes separately on said two front members of said side frames by means of fixing members.

2. The adjustable computer case support as claimed in claim 1, wherein each of said two curved front members is provided at a rear end with a pivotally turnable bracket, said two brackets being adapted to bear against a rear side of a computer case positioned on said bottom frame when said front edge of said bottom frame is adjusted to a raised position.

3. The adjustable computer case support as claimed in claim 1, wherein each of said two side frames has casters separately connected to lower ends of said front and rear members to enable smooth moving of said computer case support.

4. The adjustable computer case support as claimed in claim 1, wherein said fixing members are screws and nuts.

5. The adjustable computer case support as claimed in claim 1, wherein said bottom frame includes a width-adjusting member and two supporting members separately connected to two lateral sides of said width-adjusting member; each of said two supporting members being provided at front and rear end of a side surface with a plurality of mounting holes, and said supporting members being separately pivotally connected at a rearmost one of said mounting holes to said lower members of said two side frames, and detachably connected at a selected one of said mounting holes to said through holes on said curved front members of said two side frames by means of fixing members.

6. The adjustable computer case support as claimed in claim 5, wherein said width adjusting member is an X-type bracing including two intersected braces in the form of two long plates pivotally connected at middle points; said two braces being fixedly connected at two rear ends to said two supporting members and movably connected at two front ends to said two supporting members.

7. The adjustable computer case support as claimed in claim 6, wherein said two braces are movably connected at front ends to two long slots separately provided near front ends of said two supporting members by means of screws and nuts, such that said front ends of said two braces are slidable along said long slots.

8. The adjustable computer case support as claimed in claim 5, wherein each of said two supporting members is provided on an upper surface with a plurality of anti-slip pads adapted to prevent a computer case from sliding backward on said bottom frame adjusted to a rearward inclined position.

\* \* \* \* \*